United States Patent [19]
Pedgonay

[11] 4,142,410
[45] Mar. 6, 1979

[54] TURNER-TRANSDUCER SYSTEM
[76] Inventor: John S. Pedgonay, P.O. Box 127, Aberdeen, Md. 21001
[21] Appl. No.: 900,789
[22] Filed: Apr. 28, 1978
[51] Int. Cl.² .............................................. G01M 9/00
[52] U.S. Cl. .................................................... 73/147
[58] Field of Search ................. 73/147, 167, 212, 182
[56] References Cited
U.S. PATENT DOCUMENTS
4,072,049 2/1978 Miller ..................................... 73/147

Primary Examiner—Donald O. Woodiel
Attorney, Agent, or Firm—John F. McClellan, Sr.

[57] ABSTRACT

An aerodynamic-pressure transducer system for directly indicating pressure distribution around the circumference of a body to be observed, such as an ogive spinning on a test stand which may be in a wind tunnel, includes a stationary transducer mounted axially at one end of a power-rotated hollow shaft which spins with the body to be observed, and having tubular communication through the spinning hollow-shaft to a tubing fixed transversely to the hollow shaft and extending radially to the surface of the body to be observed.

5 Claims, 1 Drawing Figure

U.S. Patent  Mar. 6, 1979  4,142,410
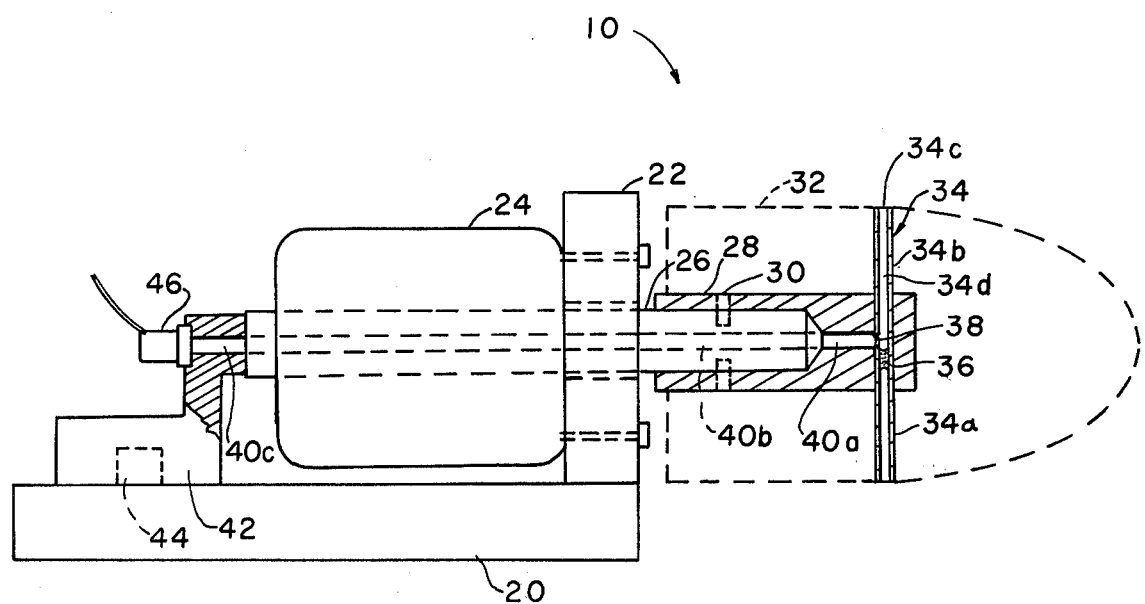

TURNER-TRANSDUCER SYSTEM

This invention relates generally to test equipment and specifically to aerodynamic-pressure indication means and method. In the prior art indirect means and methods, involving stress indicators have been employed to ascertain pressure distribution around shell and rocket ogive shapes and the like when spun on test stands, as in conjunction with wind tunnel studies.

However, it is believed that it has not heretofore been possible to make continuous, direct pressure readings at a point in the surface of a spinning body such as a shell casing, because of difficulties in orbiting sensors.

A principal object of the present invention is to provide continuous readout of pressures obtaining in the orbit of a point on a spinning body, employing a turner for the body and a transducer or the like for the readout.

Further objects are to provide means and method for the invention which are simple, reliable, and which provide results directly indicative of the phenomenon observed.

The above and other objects and advantages will become more apparent on examination of the drawing FIGURE.

The FIGURE diagrams the parts in side elevation, partially in section; it will be understood that other apparatus would be suitable to provide equivalent relations and results.

Conventional parts of the apparatus in this embodiment 10 comprise an "L" shaped stand with preferably steel base 20 and upright 22, supporting electric drive motor 24 which by means of shaft 26 spins hub 28 which may have pin affixation 30 to the shaft.

Body 32, or aerodynamic surface to be spun, may be attached in any conventional manner such as by pin, bolt or clamp (not shown) to the hub.

Provisions of this invention include a tube 34, which may be for precision and to indicate the range of suitable size, hypodermic-needle tubing, fixed to the hub symmetrically for balance, transverse to the axis of spin within the body, with one radial portion 34a having a plug 36 and the other radial portion 34b having opening at the end 34c through the body 32. Communicating with the transverse tubing bore 34d through an intermediate opening 38 is a bore 40a, 40b coaxial to the driveshaft and extending rearwardly through the hub, driveshaft and motor to the end of the driveshaft, where pedestal 42, which may have magnetic adjustably aligning affixation 44 to the base, supports pressure-transducer 46 in axial confrontation with the bore through a passage 40c in the pedestal.

In operation, as the body spins, pressures in the orbit of the end 34c of the transverse tubing directly communicate through the transverse tubing bore 34d to conveniently stationary instrumentation represented by the pressure transducer 46.

Slip-rings, telemetry, strain gauges and all other equipment of such nature are rendered unnecessary by the invention, as is necessity to extrapolate indirect readings into pressure readings. It is evident that with plug removed, null values for the system can be conveniently obtained.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. In a system for determining circumferential pressure distribution around a spinning body, including a shaft, means for holding the body for spinning by the shaft, means for spinning the shaft, and sensing means, the improvement comprising: said means for determining being means for giving direct pressure reading continuously around the circumference of spin, including a tube fixed transversely at a first end portion of the shaft for spinning with the shaft and having an end opening through the spinning body; the sensing means being a pressure transducer at a second end portion of the shaft and having a mounting stationary relative to said spinning; the shaft having a bore communicating with the tube and communicating with the pressure transducer through meeting of said shaft with a portion of said stationary mounting having a passage leading to said pressure transducer, whereby pressure distribution at said open end of the tube is communicated through the bore to the transducer as pressure distribution around the spinning body.

2. In a system as recited in claim 1, the tube extending symmetrically on both sides of said shaft for balance, and having means for plugging one said side extension of the tube.

3. In a system as recited in claim 2, the means for holding comprising a stand having base and upright, and the means for spinning including a motor having mounting on the upright.

4. In a system as recited in claim 3, said stationary mounting including aligning means adjustable on said base.

5. Method of indicating circumferential pressure distribution around a spinning body, employing a pressure sensor, comprising the steps:
    (a) providing an opening in the spinning body at a circumferential portion;
    (b) continuously communicating said opening with a bore in said spinning body coaxial with said spinning;
    (c) fixing said pressure sensor stationary relative to said spinning at a location axial to said bore;
    (d) and communicating said bore with the pressure sensor for continuous indication of pressure changes, in all said communicating thereby indicating circumferential pressure distribution around said spinning body.

* * * * *